United States Patent
Falko

(10) Patent No.: US 9,280,387 B2
(45) Date of Patent: Mar. 8, 2016

(54) SYSTEMS AND METHODS FOR ASSIGNING CODE LINES TO CLUSTERS WITH STORAGE AND OTHER CONSTRAINTS

(75) Inventor: Andrey Falko, Walnut Creek, CA (US)

(73) Assignee: salesforce.com, inc., San Francisco, CA (US)

(*) Notice: Subject to any disclaimer, the term of this patent is extended or adjusted under 35 U.S.C. 154(b) by 615 days.

(21) Appl. No.: 13/593,095

(22) Filed: Aug. 23, 2012

(65) Prior Publication Data

US 2013/0219364 A1 Aug. 22, 2013

Related U.S. Application Data

(60) Provisional application No. 61/527,461, filed on Aug. 25, 2011.

(51) Int. Cl.
- *G06F 9/44* (2006.01)
- *G06F 9/46* (2006.01)
- *G06F 9/48* (2006.01)
- *G06F 11/36* (2006.01)
- *G06F 9/38* (2006.01)
- *G06F 9/50* (2006.01)

(52) U.S. Cl.
CPC ............ *G06F 9/4881* (2013.01); *G06F 9/3836* (2013.01); *G06F 9/5066* (2013.01); *G06F 11/3664* (2013.01); *G06F 11/3672* (2013.01)

(58) Field of Classification Search
None
See application file for complete search history.

(56) References Cited

U.S. PATENT DOCUMENTS

| | | | |
|---|---|---|---|
| 5,408,663 A * | 4/1995 | Miller | 718/104 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |

(Continued)

*Primary Examiner* — Jason Mitchell
*Assistant Examiner* — Mark Gooray
(74) *Attorney, Agent, or Firm* — Blakely Sokoloff Taylor & Zafman LLP

(57) ABSTRACT

In accordance with disclosed embodiments, there are provided methods, systems, and apparatuses for assigning code lines to clusters with storage and other constraints in an on-demand service environment including, for example, receiving as input, a plurality of code lines for test within a host organization; determining available resource capacity for each of a plurality of clusters within the host organization; determining required resource capacity for each of the plurality of code lines for test within the host organization; sorting the plurality of clusters according to the determined available resource capacity for each; sorting the plurality of code lines according to the determined required resource capacity for each; and allocating the plurality of code lines amongst the plurality of clusters based on the sorting of the plurality of clusters and based further on the sorting of the plurality of code lines. Other related embodiments are disclosed.

29 Claims, 9 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,596,788 B1 * | 9/2009 | Shpigelman ................ 718/100 |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0283786 A1 * | 12/2005 | Dettinger et al. ............ 718/104 |
| 2007/0094665 A1 * | 4/2007 | Jackson ...................... 718/104 |
| 2007/0288224 A1 * | 12/2007 | Sundarrajan et al. ......... 703/22 |
| 2009/0178045 A1 * | 7/2009 | Gupta et al. ................. 718/103 |
| 2010/0153960 A1 * | 6/2010 | Youn et al. .................. 718/104 |
| 2011/0231696 A1 * | 9/2011 | Ji et al. ........................ 714/3 |
| 2012/0266176 A1 * | 10/2012 | Vojnovic et al. ............ 718/104 |

* cited by examiner

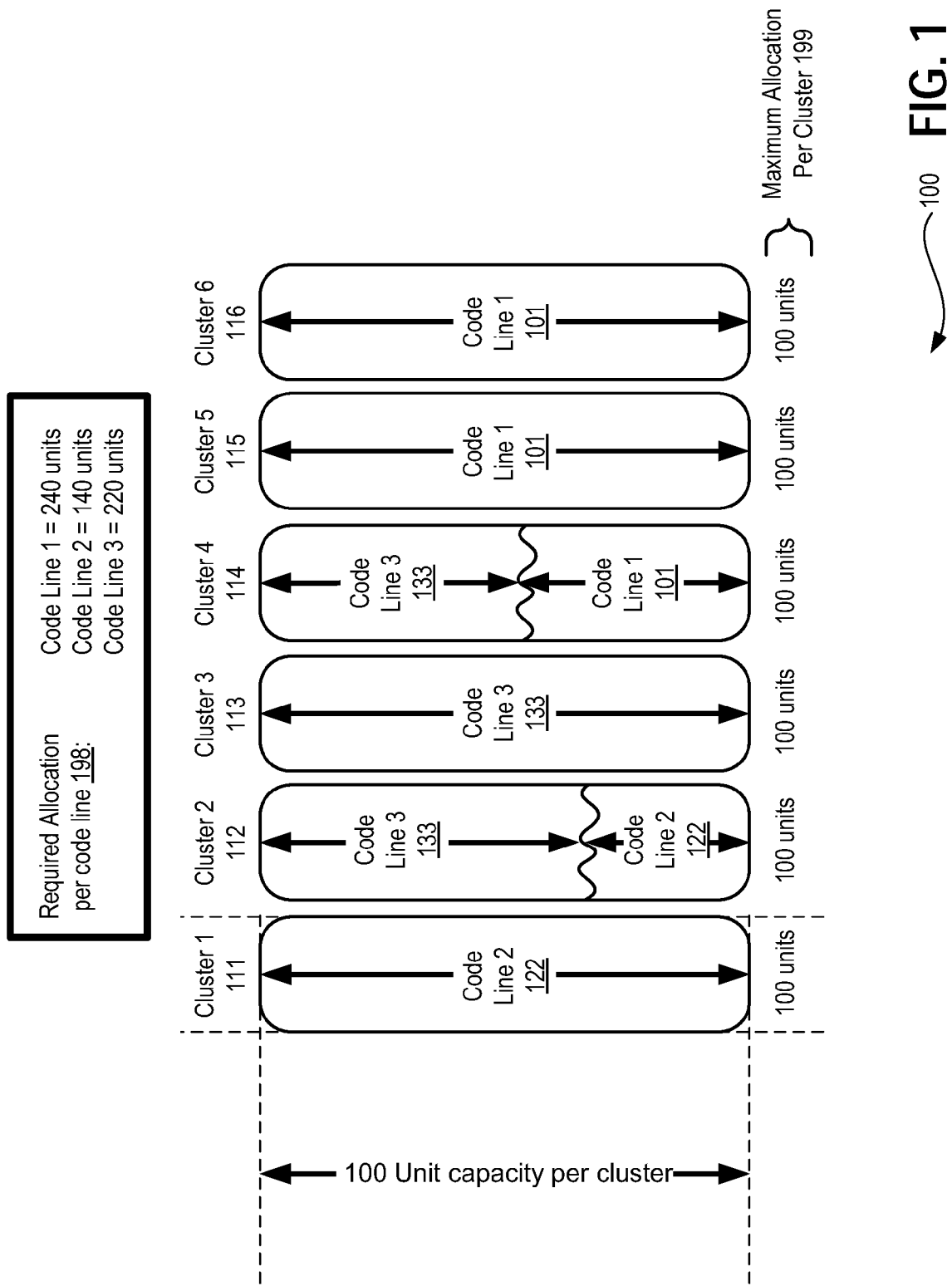

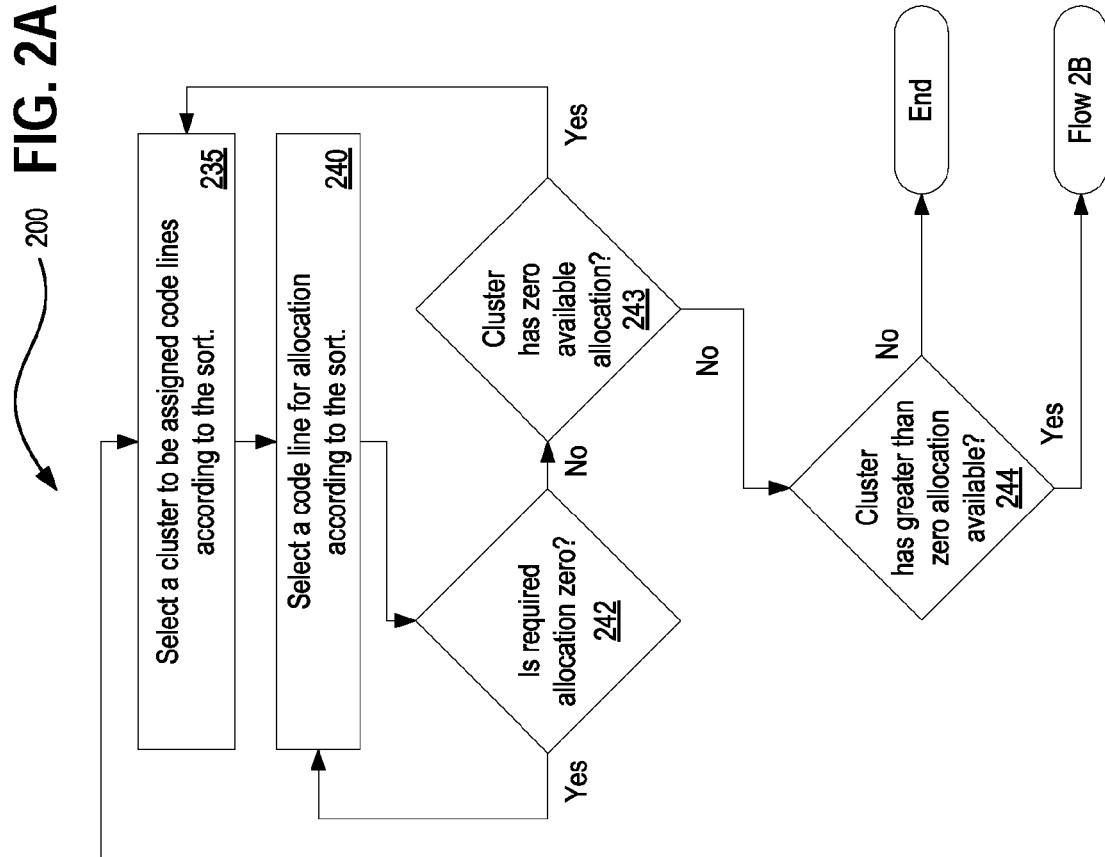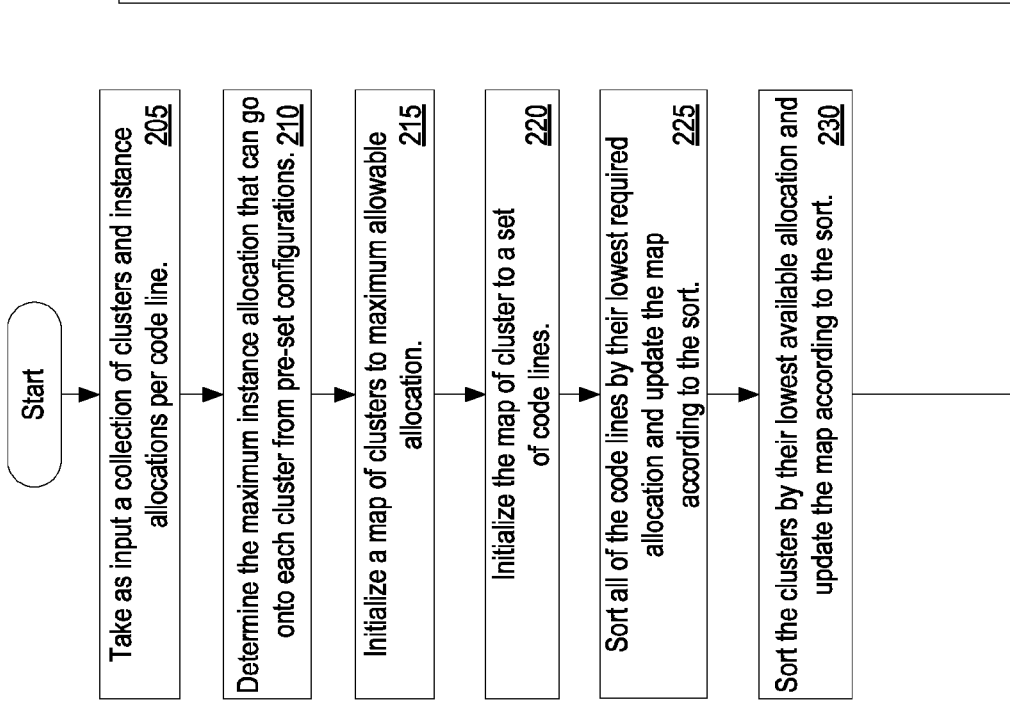

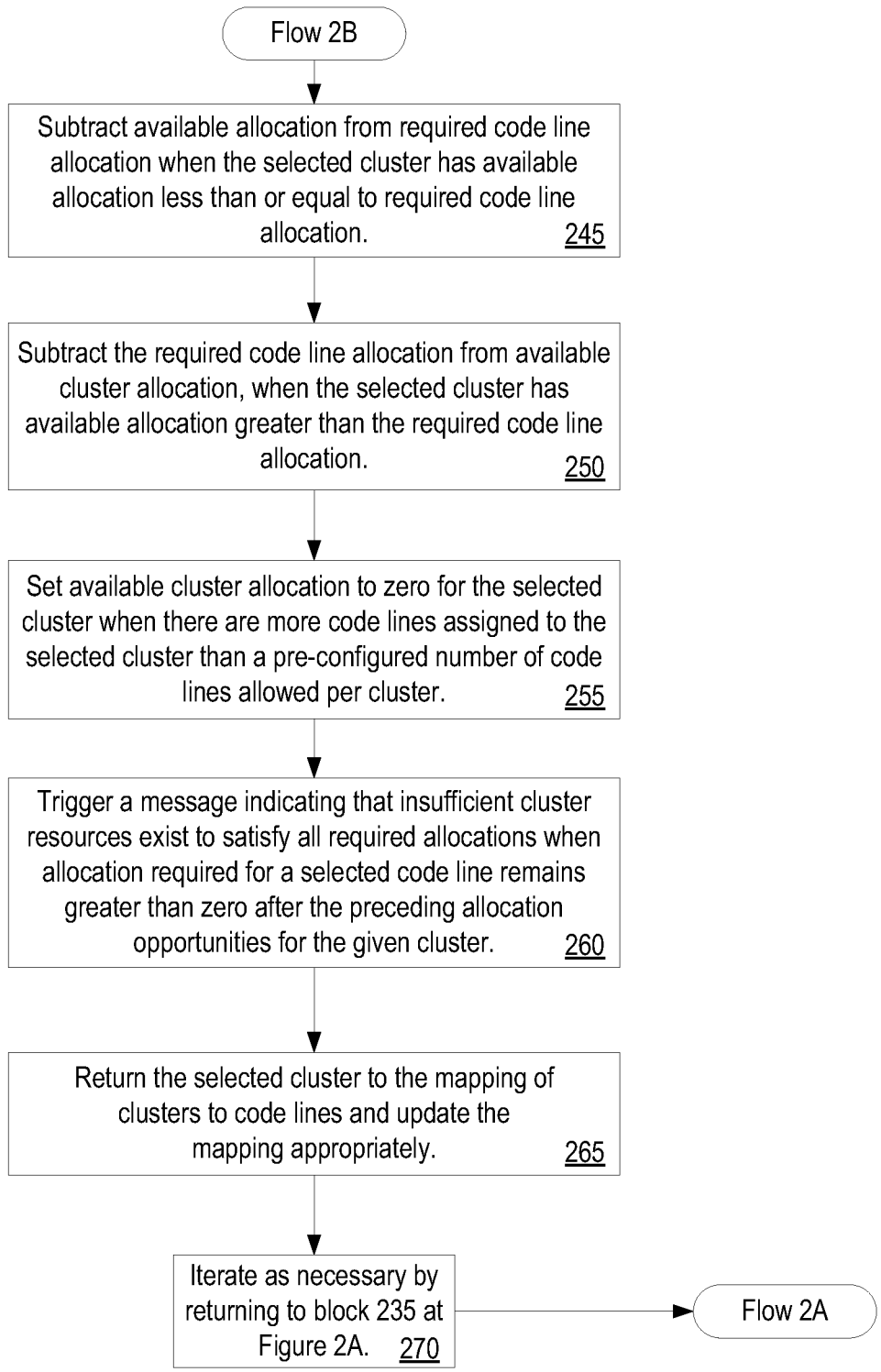

SYSTEMS AND METHODS FOR ASSIGNING CODE LINES TO CLUSTERS WITH STORAGE AND OTHER CONSTRAINTS

CLAIM OF PRIORITY

This application is related to, and claims priority to, the provisional utility application entitled "Systems and Methods for Assigning Code Lines to Clusters with Storage and Other Constraints," filed on Aug. 25, 2011, having an Application No. of 61/527,461, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly, to systems and methods for assigning code lines to clusters with storage and other constraints in an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to the claimed embodiments.

There is a widely understood need to test code before releasing the code into production.

One approach for testing code, particularly in an on-demand system, is to create a development environment which is separate from the production environment and run tests in that development environment. In such a way, side-effects resulting from running the tests purportedly do not negatively influence the production environment. However, several problems exist with such a model. First, in an on-demand system, the development and production environments may use the same infrastructure. Hence, the development environment consumes resources that may otherwise be used for production work, resulting in a less efficient production environment.

Furthermore, the system components which make up the infrastructure may be subject to various constraints, such as storage capacity or processing power, and may also be non-uniform, with components of the development infrastructure having potentially different storage capacity and processing power constraints for performing computational operations, thus creating complexity in how to best utilize the resources made available for performing such test operations.

The present state of the art may therefore benefit from methods, systems, and apparatuses for assigning code lines to clusters with storage and other constraints in an on-demand service environment as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1 depicts an exemplary architectural overview of the environment in which embodiments may operate;

FIGS. 2A-2B set forth an exemplary flow diagram illustrating a method for assigning code lines to clusters with storage and other constraints in an on-demand service environment in accordance with disclosed embodiments;

DETAILED DESCRIPTION

Figure 3A:
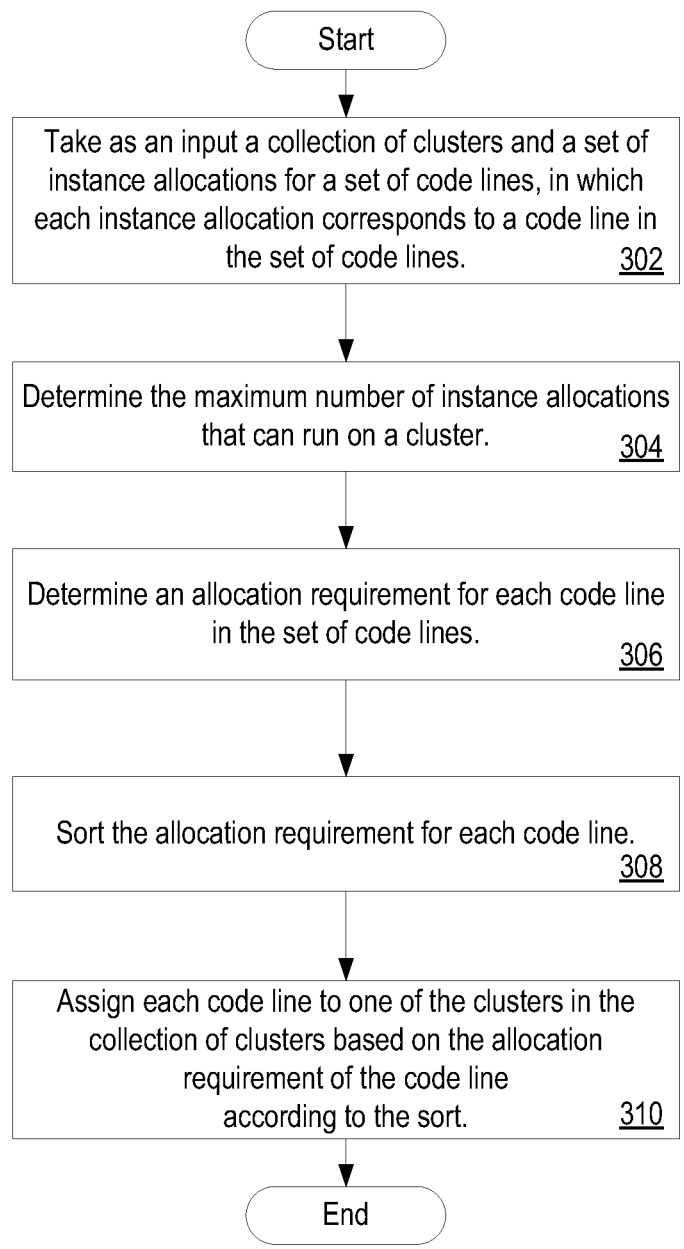
FIGS. 3A-3B set forth alternative exemplary flow diagrams illustrating methods for assigning code lines to clusters with storage and other constraints in an on-demand service environment in accordance with disclosed embodiments.

Described herein are systems, devices, and methods for assigning code lines to clusters with storage and other constraints in an on-demand service environment.

In one embodiment, such mechanisms include receiving as input, a plurality of code lines for test within a host organization; determining available resource capacity for each of a plurality of clusters within the host organization; determining required resource capacity for each of the plurality of code lines for test within the host organization; sorting the plurality of clusters according to the determined available resource capacity for each; sorting the plurality of code lines according to the determined required resource capacity for each; and allocating the plurality of code lines amongst the plurality of clusters based on the sorting of the plurality of clusters and based further on the sorting of the plurality of code lines. In the description, test, tests, and testing are used interchangeably to refer to testing for each of the plurality of code lines provided as input or deployed for testing to the clusters that provide test resources and capabilities for testing the code lines.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architectural overview 100 of the environment in which embodiments may operate.

In particular, there are multiple clusters depicted from cluster 1 at element 111, cluster 2 at element 112, cluster 3 at element 113, cluster 4 at element 114, cluster 5 at element 115, and cluster 6 at element 116. There is a maximum allocation per cluster depicted at element 199 along the horizontal axis, which in this exemplary embodiment, equals "100 units," although the quantity may obviously be different. The maximum allocation per cluster 199 corresponds to the depicted 100 unit capacity per cluster on the vertical axis.

In this example, there are three distinct code lines depicted, code line 1 at element 101, code line 2 at element 122, and code line 3 at element 133. Element 198 sets forth the required allocation per code line according to this example, in which code line 1 (element 101) requires allocation of 240 units; further in which code line 2 (element 122) requires allocation of 140 units; and lastly in which code line 3 (element 133) requires allocation of 220 units. In such an embodiment, the required allocation per code line 198 may be pre-known or pre-determined, for example, via an allocation map or other available metadata specifying the allocation requirements for the code lines (101, 122, and 133) requiring allocation, distribution, and test. Moreover, the available capacity of the clusters may also be pre-known or pre-determined, for example, via the allocation map. Here, there are six clusters, each with 100 available units, and thus 600 total units of capacity. Notably however, no code line (101, 122, or 133) is sufficiently small as to fit within a single cluster.

In an actual implementation, there is likely to be greater variance in both the capacities of the clusters, the number of available clusters, and the requisite capacity demanded by each code line requiring allocation, distribution, and test. It is this variance among the available clusters and the requisite capacity demanded by each code line that increases the complexity of distribution and makes the problem of a most efficient distribution more difficult.

In the example depicted, code line 2 at element 122 is the least resource intensive among the three code lines to be allocated, requiring 140 units. According to one embodiment, the requisite capacity for code line allocation is sorted or ranked on a per-code line basis according to the requisite capacity for code line allocation. In this exemplary embodiment, the code lines are ranked from the least resource intensive to the most resource intensive. For instance, the code lines may be sorted or ranked and this sorting or ranking may be stored within an allocation map. Thus, in the depicted embodiment, the code lines may be ranked for allocation with code line 2 at element 122 first requiring only 140 units, then code line 3 at element 133 next requiring 220 units, and finally code line 1 at element 101 ranked last requiring 240 units and thus corresponding to the code line with the greatest requisite capacity for allocation.

Using such a sorting or ranking, the code lines are allocated to the available clusters. Here, the code line with the least or lowest requisite capacity is allocated first, and thus, code line 2 at element 122 is selected as the code line having the lowest requisite capacity requirement and it is allocated to cluster 1 at element 111, thus consuming the entirety of the available capacity of cluster 1 (element 111). In such an embodiment, an allocation map may be updated reflecting that code line 2 has been allocated to cluster 1, however, in this example, while all of cluster 1 has been consumed and thus has no remaining capacity whatsoever, there remains 40 additional units of code line 2 which must be allocated, determined by subtracting the 100 units of allocated capacity of cluster 1 for code line 2 from the requisite capacity of 140 units of code line 2 thus resulting in 140−100=40. Accordingly, as can be seen from the depiction at cluster 2 (element 112), a sub-portion of cluster 2 is allocated to code line 2 (element 122), thus fulfilling the complete allocation of code line 2 and partially but not completely consuming the available capacity of cluster 2. Once again, an allocation map may be updated, for instance, updating the requisite allocation needs of code line 2 to zero since the code line is wholly allocated and further updating the available capacity of cluster 2 to reflect the consumption of the remaining 40 units for code line 2 from the total capacity of cluster 2, thus resulting in 60 units remaining for allocation at cluster 2.

The above process then repeats for the remaining code lines requiring allocation. In this example, code line 2 which is the least resource intensive is wholly allocated, and thus, the next resource intensive code line is selected according to the ranking or sorting, and thus, code line 3 is next taken up and selected for allocation.

Upon taking up allocation of code line 3, an updated allocation map consistent with the present example will reflect zero available capacity at cluster 1, 60 units of available capacity at cluster 2, and 100 units of available capacity at each of clusters 3-6.

In one embodiment, the clusters themselves are further ranked or sorted according to their capacities. In one embodiment, the clusters are ranked or sorted from the cluster having the least total capacity first through the cluster having the most capacity last. This sorting or ranking may occur prior to any allocation, in which each of clusters 1-6 will be equal, each at 100 units a piece, or iteratively, in which cluster 1 will be first with zero capacity in this example (due to code line 2 having consumed its capacity) and cluster 2 will be the next to lowest capacity cluster in the sort because a portion of its 100 units were consumed by code line 2, and the remaining 3-6 clusters will follow, each having 100 units remaining.

Thus, code line 3 now selected for allocation is first allocated, to the extent possible, to cluster 2, thus consuming the remaining capacity and an allocation map may be updated as described previously. Code line 3 will continue to be allocated by selecting cluster 3 next according to a ranking, thus consuming all of cluster 3's 100 total units, and finally code line 3 will be allocated to cluster 4, consuming some but not all of cluster 4's total capacity. Lastly, code line 1 at element 101 will be taken up for allocation, following the above methodology.

Through practice of the preceding methodologies, systems and methods for assigning code lines to clusters with storage and other constraints in an on-demand service environment may be realized.

In such an on-demand environment, it became apparent that a need existed to concurrently run a set of tests for a variety of code lines. A resource of vSphere clusters was available in an experimental environment in which cluster had a finite and limited amount of storage space as well as a number of allowable test runs or instance allocations per cluster. Notably, however, any virtual machine management software supporting host groups (e.g., clusters) and shared storage could utilize the algorithms described herein. Under the most simple of circumstances, it is only be necessary to run tests for one code line, in which case one may simply dictate that the single code line is given an instance allocation according to the following rule set: the number of clusters multiplied by instance allocation per cluster, thus yielding a total quantity of available instance allocations across all available clusters.

However, such a simplistic model was no longer practical once simultaneous testing for multiple code lines was required. Such a requirement increased the complexity of allocation and further necessitated a more efficient allocation means which ensures the best total test coverage for the multiple tests required amongst the available test capacity realized through the various clusters and their constraints, such as storage capacity, processing power, and a determined per-cluster instance allocation allowed.

For example, consider a requirement that one code line have an instance allocation of exactly 20% of total capacity. If there were 5 clusters of equal capacity and resource, then one cluster may be allocated or assigned for that particular code line, thus resulting in a 20% allocation for that code line (given that one whole cluster equates to 20%). However, if instead there were 4 clusters, each of equal capacity, and 20% allocation was required for the code line, then two code lines will need to be placed upon at least one of the four clusters, thus forcing the cluster to share its total available capacity with another code line in an effort to reach the 20% mandated allocation, else a code line will consume 25% of capacity in the 4-cluster example.

Further complicating matters was the fact that, in actual implementation environments, storage capacity on certain clusters limited total allocation of code lines (e.g., instance allocation per cluster) to only two code lines per cluster. Such a limit may be caused by the finite amount of storage capacity available at a given cluster and the fact that each code line consumes storage capacity through its own resource needs and resource requirements of a corresponding base image required to be allocated with the code line so as to perform the test.

Thus, while a theoretical greater capacity may allow for more instance allocations per cluster, in reality, any given cluster will have a limited amount of storage which will be consumed by some finite and limited number of allocations. In the described example, there may be resources only for two simultaneous code line allocations. Thus, when three or more code lines required allocation amongst the available clusters, a further need arose to ensure that no cluster shares more than two code lines due to the resource constraints and the correlated per-cluster allocation limits. Obviously different numbers are usable, for instance, with greater resources some clusters may have higher per-cluster instance allocations and other clusters having fewer resources may yield fewer per-cluster instance allocations. Further still, the instance allocation across a group of clusters may be non-uniform due to inconsistent constraints and resource capacities at the various clusters available for allocation of code lines.

In addressing the above complexities and problems of allocation, an initial algorithm was developed which assigned multiple code lines per cluster, but this initial algorithm was insufficient in some instances, such as situations where two code were required to use a fraction of a single cluster. Problems also arose where allocation of code lines was attempted against clusters that were already assigned code lines and lacked further capacity for additional code lines.

So as to overcome these additional allocation complexities, further refinement to the allocation means were developed, consistent with the preceding description for the allocation of code lines 1-3 to the exemplary clusters 1-6 as set forth by FIG. 1. Refinement of the initial algorithm resulted in the following exemplary flow.

For instance, consider FIGS. 2A-2B setting forth an exemplary flow diagram illustrating a method 200 for assigning code lines to clusters with storage and other constraints in an on-demand service environment in accordance with disclosed embodiments.

Method 200 may be performed by processing logic that may include hardware (e.g., circuitry, dedicated logic, programmable logic, microcode, etc.), software (e.g., instructions run on a processing device to perform various operations such receiving, generating, populating, storing, updating, sorting, ranking, and transmitting information and data in pursuance of the systems and methods for assigning code lines to clusters with storage and other constraints in an on-demand service environment, as described herein. Some of the blocks and/or operations listed below are optional in accordance with certain embodiments. The numbering of the blocks presented is for the sake of clarity and is not intended to prescribe an order of operations in which the various blocks must occur.

Method 200 begins with processing logic for taking as input a collection of clusters and instance allocations per code line (block 205 of FIG. 2A).

At block 210, processing logic determines the maximum instance allocation that can go onto each cluster from pre-set configurations.

At block 215, processing logic initializes a map of clusters to maximum allowable allocation. In one embodiment, the cluster is utilized as the key and the value is an atomic integer.

At block 220, processing logic further initializes the map of cluster to a set of code lines. In one embodiment, the cluster is the key once again and the value is a set of code lines that will be assigned to the cluster.

At block 225, processing logic sorts all of the code lines by their lowest required allocation and updates the map according to the sort.

The sorted map is then iteratively processed according to the following. At block 230, processing logic sorts the clusters by their lowest available allocation and updates the map according to the sort.

At block 235, processing logic selects a cluster to be assigned code lines. For instance the cluster having the lowest available capacity for allocation according to the sort may be selected.

At block 240, processing logic selects a code line for allocation. For instance the code line having the lowest allocation requirement or least required allocation capacity according to the sort may be selected.

Then for each cluster, it is determined at decision point 242 whether or not allocation required for the selected code line is zero. If yes, required allocation is zero, then processing breaks out of the cluster processing loop and proceeds to selecting the next code line for allocation, effectively not assigning the code line anywhere, as its required allocation is zero.

At decision point 243, it is determined whether the cluster has no allocation available. If no allocation capacity is available, then processing skips the cluster and processes the next cluster according to the sort.

At decision point 244, it is determined whether or not the cluster has greater than zero allocation available. If no, greater than zero allocation is not available, then processing exits the entire program triggering an error as such a condition does not logically occur in the absence of an error.

Alternatively, if at decision point 244 it is determined that, "yes," the cluster has greater than zero allocation available, then flow proceeds to block 245 set forth by Flow 2B at FIG. 2B.

Thus, turning to FIG. 2B, at block 245, processing logic subtracts available allocation from required code line allocation when the selected cluster has available allocation less than or equal to required code line allocation and further updates the map setting cluster allocation to zero and assigns the selected code line to the selected cluster in the mapping of clusters to codes lines.

At block 250, processing logic subtracts the required code line allocation from available cluster allocation, when the selected cluster has available allocation greater than the required code line allocation and further updates the map setting the required allocation to zero and assigns the code line to the cluster via mapping of clusters to codes lines.

At block 255, processing logic sets available cluster allocation to zero for the selected cluster when there are more code lines assigned to the selected cluster than a pre-configured number of code lines allowed per cluster.

At block 260, processing logic triggers a message indicating that insufficient cluster resources exist to satisfy all required allocations when allocation required for a selected code line remains greater than zero after the preceding allocation opportunities for the given cluster.

At block 265, processing logic returns the selected cluster to the mapping of clusters to code lines and updates the mapping appropriately.

According to block 270, the process then iterates as necessary, for example, by returning to block 235 of Flow 2A at FIG. 2A where another cluster may be selected for processing.

Thus, the method 200 may be summarized as a means for process all available clusters and subtracting available allocation from each as code lines are assigned to them. Practice of the described algorithm ensures more code lines are never assigned to any given cluster than is allowable as each assigned code line consumes a clusters available storage capacity and other processing resources. Practice of the described algorithm further ensures that all code lines requiring a sub-portion of a cluster (e.g., less than a whole) will be assigned or allocated the requisite sub-portion and yet be able to share a remaining portion of the cluster with other code lines.

Further still, by assigning the code lines having the lowest required allocation demands, the overall system is made less susceptible to configuration mistakes because allocating the smallest (e.g., least resource intensive) code lines first and attempting allocation, to the extent possible to code lines having increasingly greater requirements, the algorithm will allocate the greatest quantity of code lines requiring tests, even if an allocation configuration error or an unreasonably resource intensive code line is present among the code lines to be allocated for test by the host organization.

Figure 3B:
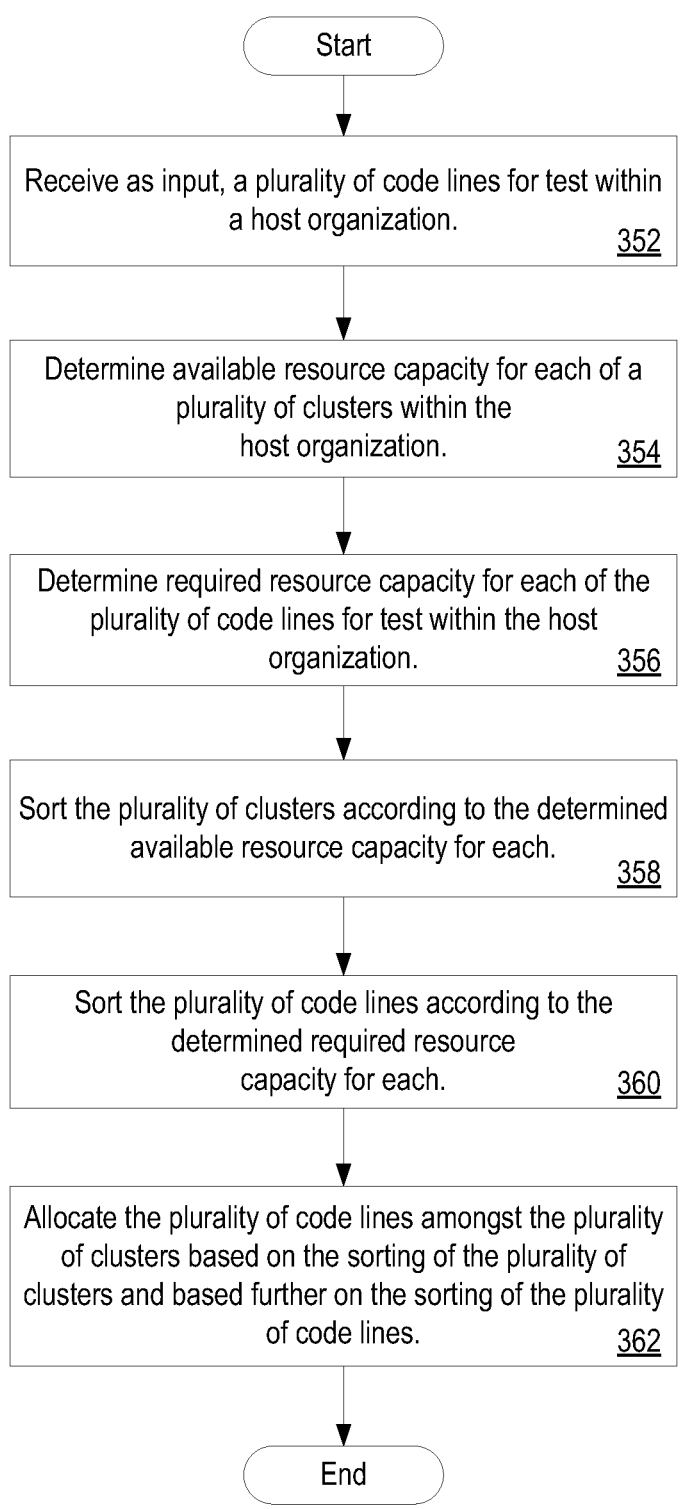

FIGS. 3A-3B set forth alternative exemplary flow diagrams illustrating methods 300 and 301 for assigning code lines to clusters with storage and other constraints in an on-demand service environment in accordance with disclosed embodiments. Methods 300 and 301 may be performed by processing logic that may include hardware (e.g., circuitry, dedicated logic, programmable logic, microcode, etc.), software (e.g., instructions run on a processing device to perform various operations in pursuance of the systems and methods for assigning code lines to clusters with storage and other constraints in an on-demand service environment, as described herein. Some of the blocks and/or operations listed below are optional in accordance with certain embodiments. The numbering of the blocks presented is for the sake of clarity and is not intended to prescribe an order of operations in which the various blocks must occur.

Method 300 of FIG. 3A begins with processing logic for taking as an input a collection of clusters and a set of instance allocations for a set of code lines, in which each instance allocation corresponds to a code line in the set of code lines (block 302 of FIG. 3A).

At block 304, processing logic determines the maximum number of instance allocations that can run on a cluster.

At block 306, processing logic determines an allocation requirement for each code line in the set of code lines.

At block 308, processing logic sorts the allocation requirement for each code line.

At block 310, processing logic assigns each code line to one of the clusters in the collection of clusters based on the allocation requirement of the code line according to the sort. In alternative or related embodiments, the clusters may also be sorted according to their available capacity and the assignment may begin with those clusters having the least available capacity according to the sort.

Method 301 of FIG. 3B begins with processing logic for receiving as input, a plurality of code lines for test within a host organization (block 352 of FIG. 3B).

At block 354, processing logic determines available resource capacity for each of a plurality of clusters within the host organization.

At block 356, processing logic determines required resource capacity for each of the plurality of code lines for test within the host organization.

At block 358, processing logic sorts the plurality of clusters according to the determined available resource capacity for each.

At block 360, processing logic sorts the plurality of code lines according to the determined required resource capacity for each.

At block 362, processing logic allocates the plurality of code lines amongst the plurality of clusters based on the sorting of the plurality of clusters and based further on the sorting of the plurality of code lines.

Through practice of the above methods 300-301, constraints on storage space within a given cluster may be accommodated. A cluster may be a virtual machine management system capable system or cluster entity capable to host, simultaneously execute, or support multiple Virtual Machines (VMs). For example, an instance allocation for a given cluster may correspond to the number of Virtual Machines that may be operated on a given cluster simultaneously according to either a configuration limit or resource constraints.

In one embodiment, every Virtual Machine is spun off from a standard image. The clusters may be refreshed from such base images with updated code, thus causing the VMs to be also updated accordingly. Different code lines requiring test may also be identified along with a required test capacity to test the code lines. For instance, code line "x" may be specified as requiring 300 Virtual Machines or instances to completely fulfill its testing capacity.

It is not feasible to simply place all the code lines requiring test onto all the available clusters because the clusters themselves are constrained by their available resources. For instance, if a cluster has 10 gigabytes of storage capacity before running out of space and each code line constitutes, for example, 5 gigabytes, then obviously, no more than two code lines can be stored on such a cluster. Supporting images for the various code lines further consume available resources. The storage used for such clusters may be expensive in terms of capital outlay, and thus, practical requirements may translate to literal constraints on available storage capacity for a given cluster. Accordingly, practice of the above methods may enable the assignment of multiple code lines to clusters with storage and other constraints in an on-demand service environment.

According to one embodiment, there is a method performed within a host organization. In such an embodiment, the method includes: receiving as input, a plurality of code lines for test within the host organization; determining available resource capacity for each of a plurality of clusters within the host organization; determining required resource capacity for each of the plurality of code lines for test within the host organization; sorting the plurality of clusters according to the determined available resource capacity for each; sorting the plurality of code lines according to the determined required resource capacity for each; and allocating the plurality of code lines amongst the plurality of clusters based on the sorting of the plurality of clusters and based further on the sorting of the plurality of code lines.

According to a variant of the above method, sorting the plurality of clusters according to the determined available resource capacity for each includes: sorting the plurality of clusters according to the cluster having the lowest available resource capacity to the cluster having the greatest available resource capacity; and updating an allocation map with the sorting of the plurality of clusters.

According to another variant of the above method, sorting the plurality of code lines according to the determined required resource capacity for each includes: sorting the plurality of code lines according to the code line having the lowest required resource capacity to the code line having the greatest required resource capacity; and updating the allocation map with the sorting of the plurality of code lines.

According to another variant of the above method, allocating the plurality of code lines amongst the plurality of clusters constitutes allocating in accordance with the following allocation rules: (i) select the code line having the lowest required resource capacity; (ii) if the selected code line having the lowest required resource capacity has a required resource capacity of zero, then select the code line having the next lowest and non-zero required resource capacity as the selected code line; (iii) select the cluster having the lowest available resource capacity; (iv) if the selected the cluster having the lowest available resource capacity has an available resource capacity of zero, then select the cluster having the next lowest and non-zero available resource capacity as the selected cluster; (v) if the available resource capacity of the selected cluster is less than or equal to the required resource capacity of the selected code line then: (a) update the required resource capacity of the selected code line in the allocation map by subtracting the available resource capacity for the selected cluster from the required resource capacity for the selected code line, (b) set to zero in the allocation map, the available resource capacity for the selected cluster, and (c) assign the selected code line to the selected cluster in the allocation map; (vi) if the available resource capacity of the selected cluster is greater than or equal to the required resource capacity of the selected code line then: (a) update the available resource capacity of the selected cluster in the allocation map by subtracting the required resource capacity of the selected code line from the available resource capacity of the selected cluster, (b) set to zero in the allocation map, the required resource capacity of the selected code line, and (c) assign the selected code line to the selected cluster in the allocation map; (vii) if a number of code lines assigned to the selected cluster is equal to greater than a pre-defined allowed number of code lines for the selected cluster, then: (a) set to zero in the allocation map, the available resource capacity for the selected cluster; (viii) if the required resource capacity of the selected code line is greater than zero, then: (a) trigger an indication that the plurality of clusters is insufficient to allocate all of the plurality of code lines for test, and (b) exit. Lastly, the allocation rules of this embodiment may dictate an iteration as follows: (ix) repeat allocating according to the rules (i) through (viii) if the required resource capacity for any of the plurality of code lines is greater than zero in the allocation map.

According to another variant of the above method, the code line having a lowest required resource capacity according to the sorting of the plurality of code lines is allocated first to the cluster having the lowest available resource capacity according to the sorting.

According to another variant of the above method, if the cluster having the lowest available resource capacity according to the sorting is insufficient to fully allocate the code line having the lowest required resource capacity according to the sorting, then the code line having the lowest required resource capacity is partially allocated to each of: (i) the cluster having the lowest available resource capacity, and (ii) the cluster having the next to lowest available resource capacity according to the sorting. For instance, the code line is allocated to the extent feasible to the cluster having the lowest available resource capacity, thus consuming its total available resource capacity, and then another portion of the code line will be allocated to the cluster having the next to lowest available capacity, and so forth, until the code line is fully allocated.

According to another variant of the above method, the code line having the greatest required resource capacity according to the sorting is allocated last. Also, if the host organization runs out of test capacity, then it will be the code lines requiring the greatest capacity for allocation according to the sort that will not be allocated, thus leaving a greater number of less resource intensive code lines allocated, and a smaller number of more resource intensive code lines unallocated.

According to another variant of the above method, the method further includes mapping within an allocation map, each of the plurality of code lines to one or more of the plurality of clusters based on the sorting of the sorting of the plurality of clusters and the sorting of the plurality of code lines; in which each of the plurality of code lines is assigned to the one or more clusters based on a pre-defined allowed number of code lines for one or more of the plurality of clusters and based further on available resource capacity for the one or more clusters and required resource capacity for each of the plurality of code lines; and further in which allocating the plurality of code lines amongst the plurality of clusters includes allocating according to the allocation map.

According to another variant of the above method, the available resource capacity for each of the plurality of clusters includes: a limited storage resource capacity; and a limited capacity for hosting virtual machines (VMs) corresponding to the pre-defined allowed number of code lines for each of the plurality of clusters.

According to another variant of the above method, the method further includes: determining a base image required for each of the plurality of code lines; and for each of the plurality of code lines allocated: (i) allocating the code line and the base image required for the code line to one or more Virtual Machines executing at the clusters of the host organization, and (ii) provisioning the allocated code line and the base image required for the code line to the one or more Virtual Machines executing at the clusters of the host organization.

According to another variant of the above method, determining available resource capacity for each of a plurality of clusters within the host organization includes: receiving an allocation map as an input, in which the allocation map defines the available resource capacity for each of a plurality of clusters within the host organization.

According to another variant of the above method, determining available resource capacity for each of a plurality of clusters within the host organization includes determining one or more of the following attributes for each of the plurality of clusters: processing power capacity of the cluster derived from one or more Central Processing Unit(s) of the cluster; capacity for simultaneously hosted Virtual Machines of the cluster based on a pre-defined allowed number of code lines for the cluster; and storage capacity accessible to the cluster.

According to another variant of the above method, the method further includes: determining a cluster has sufficient available resource capacity for simultaneously hosting two or more Virtual Machines based on a pre-defined allowed number of code lines for the cluster; and determining on a per Virtual Machine basis for each of the two or more Virtual Machines: (i) processing power capacity available to the Virtual Machine, and (ii) storage capacity accessible to the Virtual Machine.

According to another variant of the above method, determining available resource capacity for each of a plurality of clusters within the host organization includes determining a quantity of Storage Area Network (SAN) storage, or a quantity of Network Attached Storage (NAS) storage, or a quantity of local storage, accessible to each of the plurality of clusters; in which determining required resource capacity for each of the plurality of code lines for test within the host organization includes determining a quantity of SAN storage required to store each of the plurality of code lines and to store a corresponding base image required by each of the plurality of code lines; and in which the required resource capacity for each of the plurality of code lines and the corresponding base image required by each of the plurality of code lines is non-uniform.

According to another variant of the above method, determining available resource capacity for each of the plurality of clusters within the host organization further includes: determining minimal processing power requirements for each of the plurality of code lines, in which the minimal processing power requirements differ among the plurality of code lines.

According to another variant of the above method, receiving as input, a plurality of code lines for test within the host organization includes: receiving, as the input, a set of known and pre-configured code lines for test within the host organization.

According to another variant of the above method, the set of known and pre-configured code lines for test within the host organization defines one or more of the following attributes for each of the plurality of code lines for test within the host organization: required minimal processing power for performing test on the code line; required storage capacity for storing the code line and for storing a corresponding base image required by code line.

According to another variant of the above method, each of the plurality of clusters within the host organization includes: operational memory for the cluster; one or more Central Processing Units (CPUs) constituting a quantity of processing power for the cluster; a limited quantity of storage capacity accessible to the cluster; a network interface; one or more simultaneously executing Virtual Machines on the cluster capable to support a corresponding pre-defined number of allowable code lines on the cluster; and wherein each of the Virtual Machines are allocated thereto: (i) at least a portion of the operational memory for the cluster; (ii) at least a portion of the quantity of processing power for the cluster, (iii) at least a portion of the limited quantity of storage capacity accessible to the cluster; and (iv) at least a portion of network capacity available to the cluster through the network interface.

According to another variant of the above method, allocating the plurality of code lines amongst the plurality of clusters further includes: comparing the determined required resource capacity for each of the plurality of code lines for test within the host organization against the Virtual Machine allocations to determine adequacy for allocating any one of the plurality of code lines to a Virtual Machine at the cluster.

According to another variant of the above method, the method further includes generating an allocation map representing: (i) all Virtual Machines within the plurality of clusters within the host organization; (ii) assignment of every one of the plurality of code lines to a corresponding one of the Virtual Machines within the plurality of clusters; in which no more than one of the plurality of code lines is assigned to any single Virtual Machine and where any single code line is assigned to one or more Virtual Machines as needed based on the required resource capacity of the code line.

According to another variant of the above method instructions for performing the method are stored for later execution. Thus, in one embodiment, there is a non-transitory computer readable storage medium having instructions stored thereon that, when executed by a processor in a host organization, the instructions cause the host organization to perform operations including: receiving as input, a plurality of code lines for test within the host organization; determining available resource capacity for each of a plurality of clusters within the host organization; determining required resource capacity for each of the plurality of code lines for test within the host organization; sorting the plurality of clusters according to the determined available resource capacity for each; sorting the plurality of code lines according to the determined required resource capacity for each; and allocating the plurality of code lines amongst the plurality of clusters based on the sorting of the plurality of clusters and based further on the sorting of the plurality of code lines.

Figure 4:
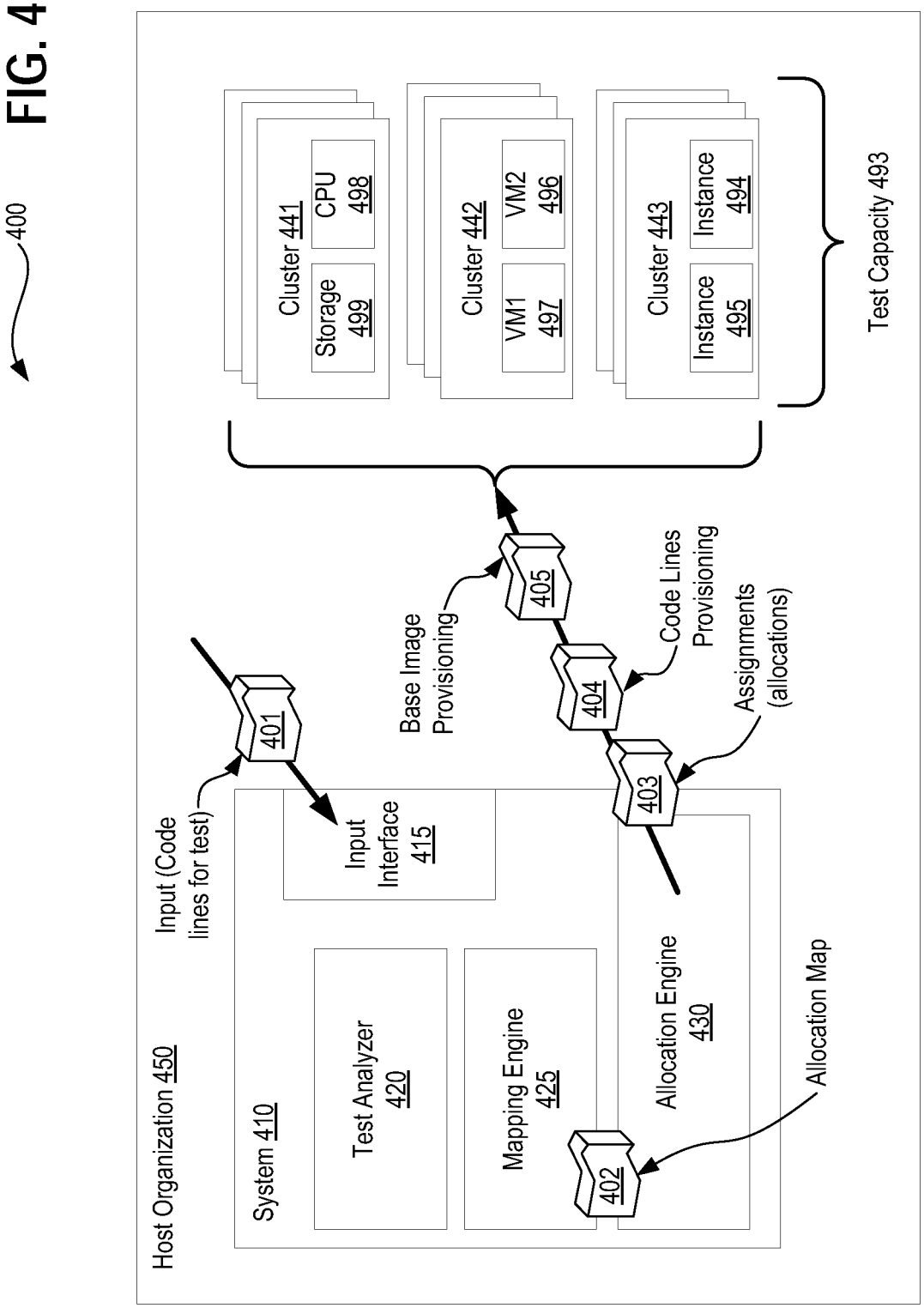
FIG. 4 depicts an exemplary architectural overview of the environment in which embodiments may operate.

FIG. 4 depicts an exemplary architectural overview 400 of the environment in which embodiments may operate. Specifically depicted is the host organization 450 having therein a system 410 and also multiple clusters 441, 442, and 443 constituting test capacity 493 for the host organization 450, for example, to implement testing of code lines.

The first group of clusters 441 includes finite storage 499 and finite CPU 498 capacity or processing power, thus setting restrictions on how many code lines, base images, or simultaneous deployment instances may operate on the cluster 441. The next group of clusters 442 includes VM1 497 and VM2 496. The number of VMs may be different, but is dictated based on a pre-specified configuration limit or based on the constraints of the cluster 442 hosting the VMs. The final group of clusters 443 includes instance 495 and instance 494. Like the VMs, the number of instances may be different, but is dictated based on a pre-specified configuration limit, such as a pre-determined number of simultaneous instances per cluster or based on the constraints of the cluster 442 upon which the instances must run, such as storage constraints or processing power constraints.

Within the system 410 there is an input interface 415 capable to receive as input 401 a plurality of code lines for testing within the host organization. Test analyzer 420 and mapping engine is further included within the system 410. Mapping engine 425 may update and/or generate the allocation map 402 and allocation engine 430 utilizes the allocation map to set assignments or allocations of code lines into the test capacity 493 and specifically onto the various clusters 441-443. Thus, in accordance with certain embodiments, the allocation engine 430 may issue assignments 403 (e.g., allocations), as well as issue code lines provisioning 404 and base image provisioning 405 to the various clusters 441-443.

Therefore, it is in accordance with one embodiment, that a system 410 is to operate within a host organization 450. In such an embodiment, the system 410 includes a processor to execute instructions; an input interface 415 to receive a plurality of code lines (e.g., input 401) for test within the host organization 450; a test analyzer 420 to: (i) determine available resource capacity for each of a plurality of clusters 441-443 within the host organization 450, and (ii) determine required resource capacity for each of the plurality of code lines (e.g., input 401) for test within the host organization 450; a mapping engine 425 to: (i) sort the plurality of clusters 441-443 according to the determined available resource capacity for each, (ii) sort the plurality of code lines (e.g., input 401) according to the determined required resource capacity for each, and (iii) update an allocation map 402 according to the sort of the plurality of clusters 441-443 and further according to the sort of the plurality of code lines; and an allocation engine 430 to allocate (e.g., assignments or allocations 403) the plurality of code lines amongst the plurality of clusters 441-443 based on the sorting of the plurality of clusters and based further on the sorting of the plurality of code lines.

Figure 5:
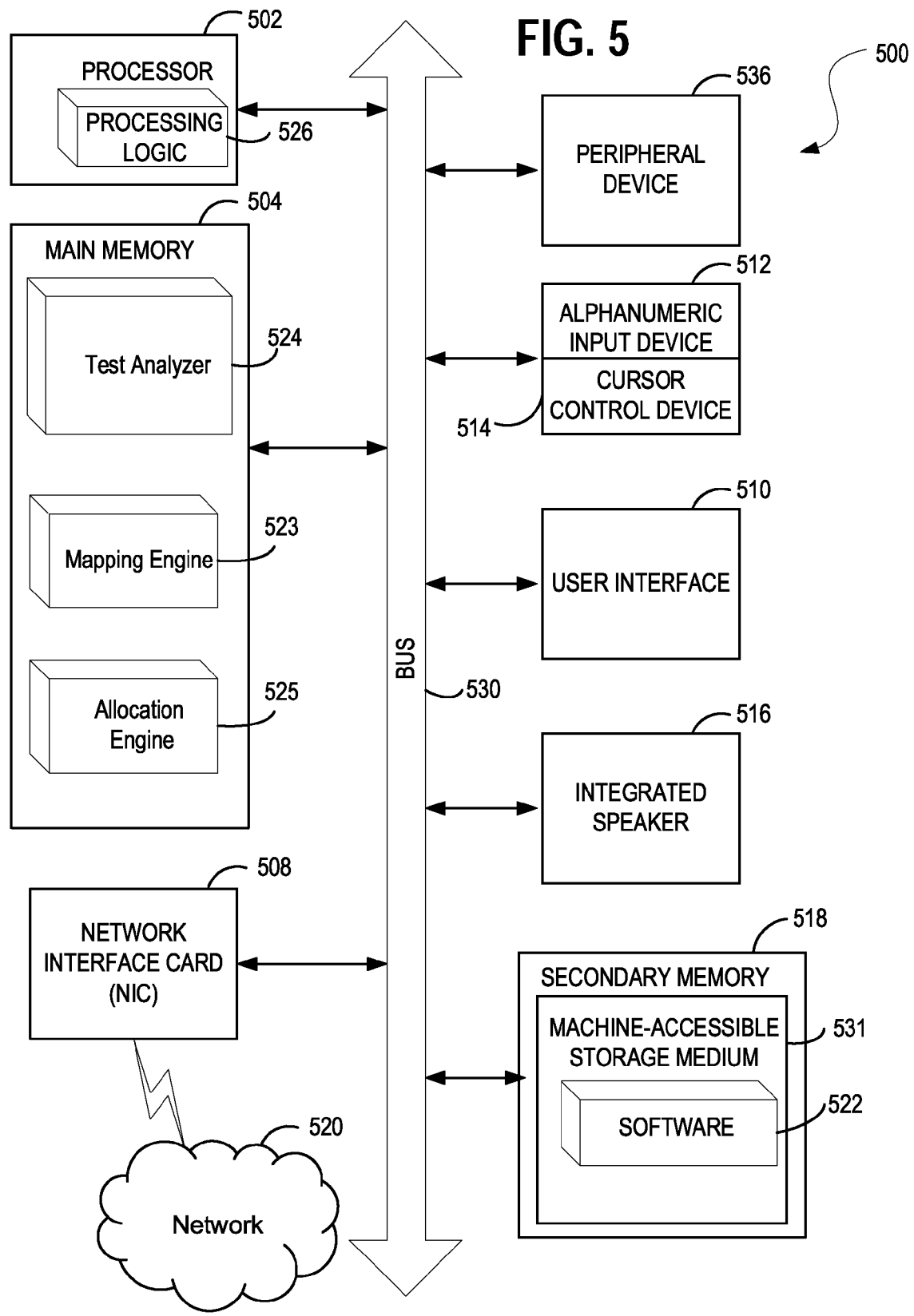
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a test analyzer 524 to determine certain attributes required for testing, such as available test capacity of clusters and required test capacity for allocating specified code lines. Main memory 504 further includes a mapping engine 523 generate and update mappings, such as an allocation map, where necessary. Main memory 504 further includes an allocation engine 525 to perform allocation and assignments of code lines as well as provisioning of the code line data packages and associated or required base images for the various code lines. Main memory 504 and its sub-elements are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

Figure 6:
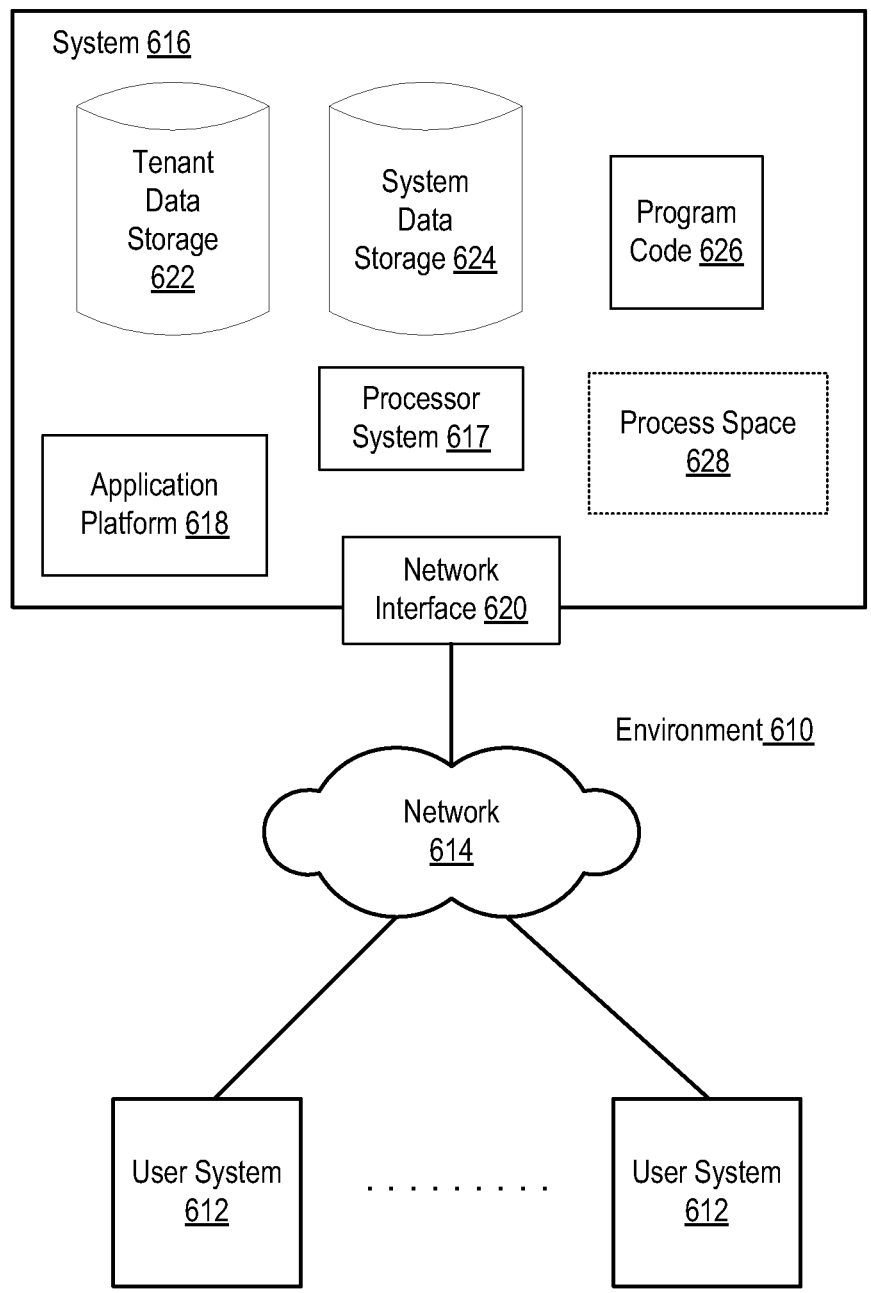
FIG. 6 illustrates a block diagram of an example of an environment wherein an on-demand database service might be used.

FIG. 6 illustrates a block diagram of an example of an environment 610 in which an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
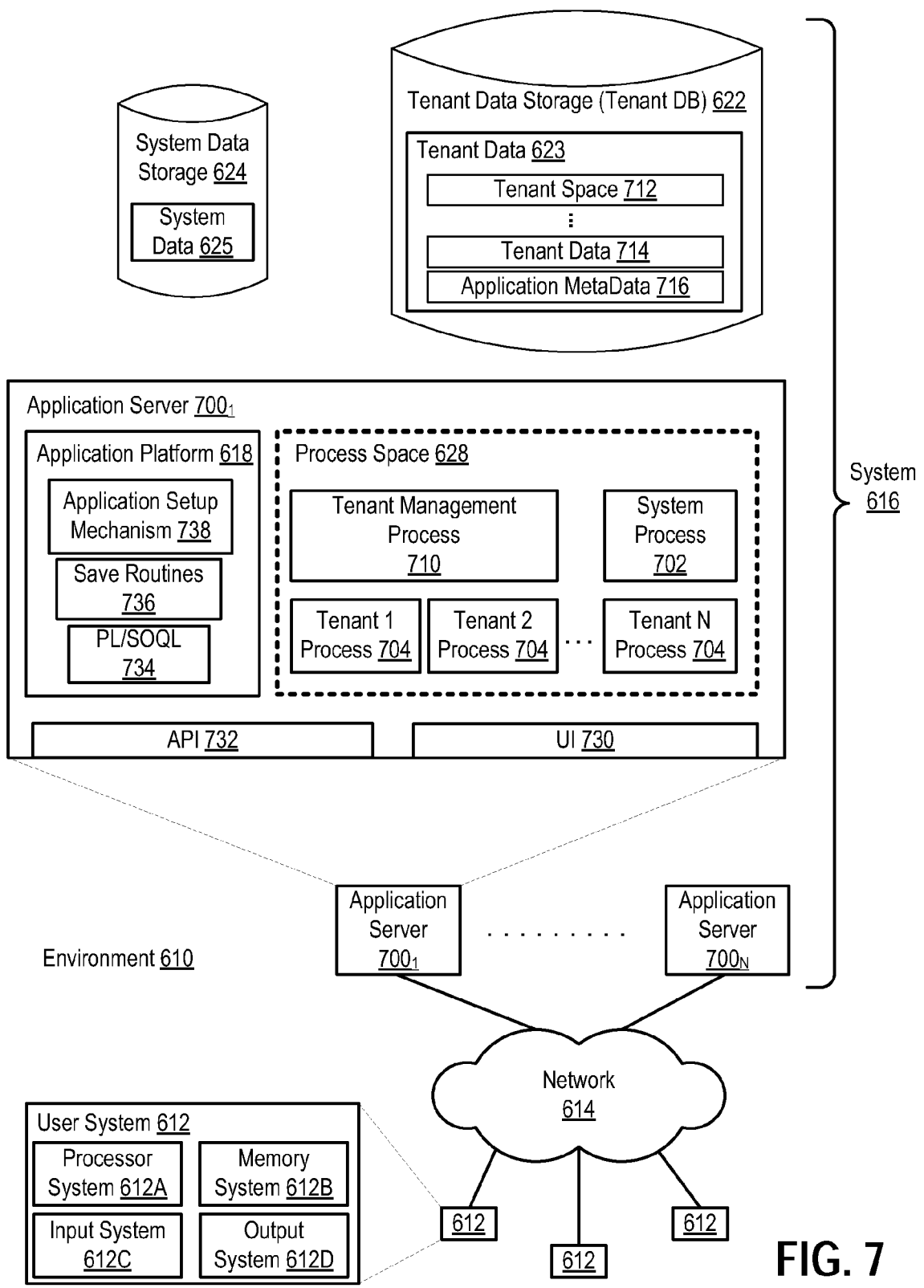
FIG. 7 illustrates a block diagram of an embodiment of elements of FIG. 6 and various possible interconnections between these elements.

FIG. 7 illustrates a block diagram of an embodiment of elements of FIG. 6 and various possible interconnections between these elements. FIG. 7 also illustrates environment 610. However, in FIG. 7, the elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level.

Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in a host organization, the method comprising:
receiving as input, a plurality of code lines for test within the host organization;
determining available resource capacity for each of a plurality of clusters within the host organization;
determining required resource capacity for each of the plurality of code lines for test within the host organization;
sorting the plurality of clusters according to the determined available resource capacity for each, wherein the plurality of clusters are ranked from the lowest available resource capacity to the greatest available resource capacity;
sorting the plurality of code lines on a per-code line basis according to the determined required resource capacity for each of the plurality of code lines, wherein the plurality of code lines are ranked from the least resource intensive to the most resource intensive; and
allocating the plurality of code lines amongst the plurality of clusters based on the sorting of the plurality of clusters and based further on the sorting of the plurality of code lines, wherein the plurality of code lines are allocated to available clusters by allocating first, code lines from among the plurality of code lines, having a least or lowest requisite capacity to a cluster having the lowest available resource capacity.

2. The method of claim 1, wherein sorting the plurality of clusters according to the determined available resource capacity for each comprises:
updating an allocation map with the sorting of the plurality of clusters.

3. The method of claim 2, wherein sorting the plurality of code lines according to the determined required resource capacity for each comprises:
sorting the plurality of code lines according to the code line having the lowest required resource capacity to the code line having the greatest required resource capacity; and
updating the allocation map with the sorting of the plurality of code lines.

4. The method of claim 1, wherein the code line having a lowest required resource capacity according to the sorting of the plurality of code lines is allocated first to the cluster having the lowest available resource capacity according to the sorting.

5. The method of claim 4, wherein if the cluster having the lowest available resource capacity according to the sorting is insufficient to fully allocate the code line having the lowest required resource capacity according to the sorting, then the code line having the lowest required resource capacity is partially allocated to each of:
(i) the cluster having the lowest available resource capacity, and
(ii) the cluster having the next to lowest available resource capacity according to the sorting.

6. The method of claim 5, wherein the code line having the greatest required resource capacity according to the sorting is allocated last.

7. The method of claim 1, further comprising:
mapping within an allocation map, each of the plurality of code lines to one or more of the plurality of clusters based on the sorting of the sorting of the plurality of clusters and the sorting of the plurality of code lines;
wherein each of the plurality of code lines is assigned to the one or more clusters based on a pre-defined allowed number of code lines for one or more of the plurality of clusters and based further on available resource capacity for the one or more clusters and required resource capacity for each of the plurality of code lines; and
wherein allocating the plurality of code lines amongst the plurality of clusters comprises allocating according to the allocation map.

8. The method of claim 7, wherein the available resource capacity for each of the plurality of clusters comprises:
a limited storage resource capacity; and
limited capacity for hosting virtual machines (VMs) corresponding to the pre-defined allowed number of code lines for each of the plurality of clusters.

9. The method of claim 1, wherein the method further comprises:
determining a base image required for each of the plurality of code lines; and for each of the plurality of code lines allocated:
(i) allocating the code line and the base image required for the code line to one or more Virtual Machines executing at the clusters of the host organization, and
(ii) provisioning the allocated code line and the base image required for the code line to the one or more Virtual Machines executing at the clusters of the host organization.

10. The method of claim 1, wherein determining available resource capacity for each of a plurality of clusters within the host organization comprises:
receiving an allocation map as an input, wherein the allocation map defines the available resource capacity for each of a plurality of clusters within the host organization.

11. The method of claim 1, wherein determining available resource capacity for each of a plurality of clusters within the host organization comprises determining one or more of the following attributes for each of the plurality of clusters:
processing power capacity of the cluster derived from one or more Central Processing Unit(s) of the cluster;
capacity for simultaneously hosted Virtual Machines of the cluster based on a pre-defined allowed number of code lines for the cluster; and
storage capacity accessible to the cluster.

12. The method of claim 1, further comprising:
determining a cluster has sufficient available resource capacity for simultaneously hosting two or more Virtual Machines based on a pre-defined allowed number of code lines for the cluster; and determining on a per Virtual Machine basis for each of the two or more Virtual Machines:
(i) processing power capacity available to the Virtual Machine, and
(ii) storage capacity accessible to the Virtual Machine.

13. The method of claim 1:
wherein determining available resource capacity for each of a plurality of clusters within the host organization comprises determining a quantity of Storage Area Network (SAN) storage, or a quantity of Network Attached Storage (NAS) storage, or a quantity of local storage, accessible to each of the plurality of clusters;
wherein determining required resource capacity for each of the plurality of code lines for test within the host organization comprises determining a quantity of SAN storage required to store each of the plurality of code lines and to store a corresponding base image required by each of the plurality of code lines; and wherein the required resource capacity for each of the plurality of code lines and the corresponding base image required by each of the plurality of code lines is non-uniform.

14. The method of claim 13, wherein determining available resource capacity for each of the plurality of clusters within the host organization further comprises:
   determining minimal processing power requirements for each of the plurality of code lines, wherein the minimal processing power requirements differ among the plurality of code lines.

15. The method of claim 1, wherein receiving as input, a plurality of code lines for test within the host organization comprises:
   receiving, as the input, a set of known and pre-configured code lines for test within the host organization.

16. The method of claim 15, wherein the set of known and pre-configured code lines for test within the host organization defines one or more of the following attributes for each of the plurality of code lines for test within the host organization:
   required minimal processing power for performing test on the code line;
   required storage capacity for storing the code line and for storing a corresponding base image required by code line.

17. The method of claim 1, wherein each of the plurality of clusters within the host organization comprises:
   operational memory for the cluster;
   one or more Central Processing Units (CPUs) constituting a quantity of processing power for the cluster;
   a limited quantity of storage capacity accessible to the cluster;
   a network interface;
   one or more simultaneously executing Virtual Machines on the cluster capable to support a corresponding pre-defined number of allowable code lines on the cluster; and
   wherein each of the Virtual Machines are allocated thereto:
   (i) at least a portion of the operational memory for the cluster;
   (ii) at least a portion of the quantity of processing power for the cluster,
   (iii) at least a portion of the limited quantity of storage capacity accessible to the cluster; and
   (iv) at least a portion of network capacity available to the cluster through the network interface.

18. The method of claim 17, wherein allocating the plurality of code lines amongst the plurality of clusters further comprises:
   comparing the determined required resource capacity for each of the plurality of code lines for test within the host organization against the Virtual Machine allocations to determine adequacy for allocating any one of the plurality of code lines to a Virtual Machine at the cluster.

19. The method of claim 17 further comprising generating an allocation map representing:
   (i) all Virtual Machines within the plurality of clusters within the host organization;
   (ii) assignment of every one of the plurality of code lines to a corresponding one of the Virtual Machines within the plurality of clusters;
   wherein no more than one of the plurality of code lines is assigned to any single Virtual Machine and where any single code line is assigned to one or more Virtual Machines as needed based on the required resource capacity of the code line.

20. Non-transitory computer readable storage medium having instructions stored thereon that, when executed by a processor in a host organization, the instructions cause the host organization to perform operations comprising:
   receiving as input, a plurality of code lines for test within the host organization;
   determining available resource capacity for each of a plurality of clusters within the host organization;
   determining required resource capacity for each of the plurality of code lines for test within the host organization;
   sorting the plurality of clusters according to the determined available resource capacity for each, wherein the plurality of clusters are ranked from the lowest available resource capacity to the greatest available resource capacity;
   sorting the plurality of code lines on a per-code line basis according to the determined required resource capacity for each of the plurality of code lines, wherein the plurality of code lines are ranked from the least resource intensive to the most resource intensive; and according to the determined required resource capacity for each; and
   allocating the plurality of code lines amongst the plurality of clusters based on the sorting of the plurality of clusters and based further on the sorting of the plurality of code lines, wherein the plurality of code lines are allocated to available clusters by allocating first, code lines from among the plurality of code lines, having a least or lowest requisite capacity to a cluster having the lowest available resource capacity.

21. The non-transitory computer readable storage medium of claim 20, wherein sorting the plurality of clusters according to the determined available resource capacity for each comprises:
   updating an allocation map with the sorting of the plurality of clusters.

22. The non-transitory computer readable storage medium of claim 21, wherein sorting the plurality of code lines according to the determined required resource capacity for each comprises:
   sorting the plurality of code lines according to the code line having the lowest required resource capacity to the code line having the greatest required resource capacity; and
   updating the allocation map with the sorting of the plurality of code lines.

23. The non-transitory computer readable storage medium of claim 22, wherein allocating the plurality of code lines amongst the plurality of clusters comprises allocating in accordance with the following allocation rules:
   (i) select the code line having the lowest required resource capacity;
   (ii) if the selected code line having the lowest required resource capacity has a required resource capacity of zero, then select the code line having the next lowest and non-zero required resource capacity as the selected code line;
   (iii) select the cluster having the lowest available resource capacity;
   (iv) if the selected the cluster having the lowest available resource capacity has an available resource capacity of zero, then select the cluster having the next lowest and non-zero available resource capacity as the selected cluster;
   (v) if the available resource capacity of the selected cluster is less than or equal to the required resource capacity of the selected code line then:
   (a) update the required resource capacity of the selected code line in the allocation map by subtracting the available resource capacity for the selected cluster from the required resource capacity for the selected code line,
(b) set to zero in the allocation map, the available resource capacity for the selected cluster, and
(c) assign the selected code line to the selected cluster in the allocation map;
(vi) if the available resource capacity of the selected cluster is greater than or equal to the required resource capacity of the selected code line then:
(a) update the available resource capacity of the selected cluster in the allocation map by subtracting the required resource capacity of the selected code line from the available resource capacity of the selected cluster,
(b) set to zero in the allocation map, the required resource capacity of the selected code line, and
(c) assign the selected code line to the selected cluster in the allocation map;
(vii) if a number of code lines assigned to the selected cluster is equal to greater than a pre-defined allowed number of code lines for the selected cluster, then:
(a) set to zero in the allocation map, the available resource capacity for the selected cluster;
(viii) if the required resource capacity of the selected code line is greater than zero, then:
(a) trigger an indication that the plurality of clusters is insufficient to allocate all of the plurality of code lines for test, and
(b) exit;
(ix) repeat allocating according to the rules (i) through (viii) if the required resource capacity for any of the plurality of code lines is greater than zero in the allocation map.

24. The non-transitory computer readable storage medium of claim 20:
wherein the code line having a lowest required resource capacity according to the sorting of the plurality of code lines is allocated first to the cluster having the lowest available resource capacity according to the sorting; and
wherein the cluster having the lowest available resource capacity according to the sorting is insufficient to fully allocate the code line having the lowest required resource capacity according to the sorting, the code line having the lowest required resource capacity is allocated to:
(i) the cluster having the lowest available resource capacity, and
(ii) the cluster having the next to lowest available resource capacity according to the sorting.

25. A system to operate within a host organization, the system comprising:
a processor to execute instructions; an input interface to receive a plurality of code lines for test within the host organization; a test analyzer to:
(i) determine available resource capacity for each of a plurality of clusters within the host organization, and
(ii) determine required resource capacity for each of the plurality of code lines for test within the host organization;
a mapping engine to:
(i) sort the plurality of clusters according to the determined available resource capacity for each wherein the plurality of clusters are ranked from the lowest available resource capacity to the greatest available resource capacity,
(ii) sort the plurality of code lines on a per-code line basis according to the requisite capacity for each of the plurality of code lines, wherein the plurality of code lines are ranked from the least resource intensive to the most resource intensive; and
(iii) update an allocation map according to the sort of the plurality of clusters and further according to the sort of the plurality of code lines; and
an allocation engine to allocate the plurality of code lines amongst the plurality of clusters based on the sorting of the plurality of clusters and based further on the sorting of the plurality of code lines, wherein the plurality of code lines are allocated to available clusters by allocating first, code lines from among the plurality of code lines, having a least or lowest requisite capacity to a cluster having the lowest available resource capacity.

26. The system of claim 25:
wherein the mapping engine to sort the plurality of code lines according to the determined required resource capacity for each comprises sorting the plurality of code lines according to the code line having the lowest required resource capacity to the code line having the greatest required resource capacity.

27. The system of claim 26, wherein the allocation engine to allocate the plurality of code lines comprises allocating in accordance with the following allocation rules:
(i) select the code line having the lowest required resource capacity;
(ii) if the selected code line having the lowest required resource capacity has a required resource capacity of zero, then select the code line having the next lowest and non-zero required resource capacity as the selected code line;
(iii) select the cluster having the lowest available resource capacity;
(iv) if the selected the cluster having the lowest available resource capacity has an available resource capacity of zero, then select the cluster having the next lowest and non-zero available resource capacity as the selected cluster;
(v) if the available resource capacity of the selected cluster is less than or equal to the required resource capacity of the selected code line then:
(a) update the required resource capacity of the selected code line in the allocation map by subtracting the available resource capacity for the selected cluster from the required resource capacity for the selected code line,
(b) set to zero in the allocation map, the available resource capacity for the selected cluster, and
(c) assign the selected code line to the selected cluster in the allocation map;
(vi) if the available resource capacity of the selected cluster is greater than or equal to the required resource capacity of the selected code line then:
(a) update the available resource capacity of the selected cluster in the allocation map by subtracting the required resource capacity of the selected code line from the available resource capacity of the selected cluster,
(b) set to zero in the allocation map, the required resource capacity of the selected code line, and
(c) assign the selected code line to the selected cluster in the allocation map;
(vii) if a number of code lines assigned to the selected cluster is equal to greater than a pre-defined allowed number of code lines for the selected cluster, then:
(a) set to zero in the allocation map, the available resource capacity for the selected cluster;
(viii) if the required resource capacity of the selected code line is greater than zero, then:

(a) trigger an indication that the plurality of clusters is insufficient to allocate all of the plurality of code lines for test, and
(b) exit;
(ix) repeat allocating according to the rules (i) through (viii) if the required resource capacity for any of the plurality of code lines is greater than zero in the allocation map.

28. The system of claim 25:
wherein the code line having a lowest required resource capacity according to the sorting of the plurality of code lines is allocated first to the cluster having the lowest available resource capacity according to the sorting; and
wherein the cluster having the lowest available resource capacity according to the sorting is insufficient to fully allocate the code line having the lowest required resource capacity according to the sorting, the code line having the lowest required resource capacity is allocated to:
(i) the cluster having the lowest available resource capacity, and
(ii) the cluster having the next to lowest available resource capacity according to the sorting.

29. A method in a host organization, the method comprising:
receiving as input, a plurality of code lines for test within the host organization;
determining available resource capacity for each of a plurality of clusters within the host organization;
determining required resource capacity for each of the plurality of code lines for test within the host organization;
sorting the plurality of clusters according to the determined available resource capacity for each, wherein sorting the plurality of clusters according to the determined available resource capacity for each comprises sorting the plurality of clusters according to the cluster having the lowest available resource capacity to the cluster having the greatest available resource capacity and updating an allocation map with the sorting of the plurality of clusters;
sorting the plurality of code lines according to the determined required resource capacity for each, wherein sorting the plurality of code lines according to the determined required resource capacity for each comprises sorting the plurality of code lines according to the code line having the lowest required resource capacity to the code line having the greatest required resource capacity and updating the allocation map with the sorting of the plurality of code lines; and
allocating the plurality of code lines amongst the plurality of clusters based on the sorting of the plurality of clusters and based further on the sorting of the plurality of code lines, wherein allocating the plurality of code lines amongst the plurality of clusters comprises allocating in accordance with the following allocation rules:
(i) select the code line having the lowest required resource capacity;
(ii) if the selected code line having the lowest required resource capacity has a required resource capacity of zero, then select the code line having the next lowest and non-zero required resource capacity as the selected code line;
(iii) select the cluster having the lowest available resource capacity;
(iv) if the selected the cluster having the lowest available resource capacity has an available resource capacity of zero, then select the cluster having the next lowest and non-zero available resource capacity as the selected cluster;
(v) if the available resource capacity of the selected cluster is less than or equal to the required resource capacity of the selected code line then:
(a) update the required resource capacity of the selected code line in the allocation map by subtracting the available resource capacity for the selected cluster from the required resource capacity for the selected code line,
(b) set to zero in the allocation map, the available resource capacity for the selected cluster, and
(c) assign the selected code line to the selected cluster in the allocation map;
(vi) if the available resource capacity of the selected cluster is greater than or equal to the required resource capacity of the selected code line then:
(a) update the available resource capacity of the selected cluster in the allocation map by subtracting the required resource capacity of the selected code line from the available resource capacity of the selected cluster,
(b) set to zero in the allocation map, the required resource capacity of the selected code line, and
(c) assign the selected code line to the selected cluster in the allocation map;
(vii) if a number of code lines assigned to the selected cluster is equal to greater than a pre-defined allowed number of code lines for the selected cluster, then:
(a) set to zero in the allocation map, the available resource capacity for the selected cluster;
(viii) if the required resource capacity of the selected code line is greater than zero, then:
(a) trigger an indication that the plurality of clusters is insufficient to allocate all of the plurality of code lines for test, and
(b) exit;
(ix) repeat allocating according to the rules (i) through (viii) if the required resource capacity for any of the plurality of code lines is greater than zero in the allocation map.

* * * * *